(12) United States Patent
Yasue et al.

(10) Patent No.: US 11,040,658 B2
(45) Date of Patent: Jun. 22, 2021

(54) VEHICLE OBSTACLE INFORMING DEVICE (71) Applicant: Toyota Jidosha Kabushiki Kaisha, Toyota (JP)

(72) Inventors: Satoshi Yasue, Toyota (JP); Kihiro Kato, Toyota (JP); Satoshi Yamamichi, Nagoya (JP); Hiroshi Hiraiwa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/661,134

(22) Filed: Oct. 23, 2019

(65) Prior Publication Data

US 2020/0130580 A1 Apr. 30, 2020

(30) Foreign Application Priority Data

Oct. 26, 2018 (JP) .............................. JP2018-202209

(51) Int. Cl.
*B60Q 9/00* (2006.01)
*G06F 3/01* (2006.01)
*G02B 27/01* (2006.01)
*G06K 9/00* (2006.01)
*G05D 1/00* (2006.01)
*G02B 27/00* (2006.01)
*G05D 1/02* (2020.01)

(52) U.S. Cl.
CPC ......... *B60Q 9/008* (2013.01); *G02B 27/0101* (2013.01); *G06F 3/013* (2013.01); *G06K 9/00805* (2013.01); *G02B 27/0093* (2013.01); *G02B 2027/0138* (2013.01); *G02B 2027/0141* (2013.01); *G05D 1/0088* (2013.01); *G05D 1/0246* (2013.01); *G05D 2201/0212* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2016/0001781 A1* | 1/2016 | Fung | G16H 50/20 701/36 |
| 2018/0012085 A1* | 1/2018 | Blayvas | G06T 7/70 |
| 2019/0019413 A1* | 1/2019 | Yun | B60W 30/18163 |
| 2019/0087668 A1* | 3/2019 | Kim | G06K 9/6274 |

FOREIGN PATENT DOCUMENTS

| | | |
|---|---|---|
| JP | 2006-219077 A | 8/2006 |
| JP | 2007-304712 A | 11/2007 |

* cited by examiner

*Primary Examiner* — Jeffrey J Chow
(74) *Attorney, Agent, or Firm* — Dinsmore & Shohl LLP

(57) ABSTRACT

A vehicle obstacle informing device includes: an obstacle detection section configured to detect an obstacle in surroundings of a vehicle; a gaze detection section configured to detect a gaze direction of an occupant seated in a driving seat; and an informing section configured to make the occupant aware of the obstacle using at least one of display or audio in cases in which the gaze of the occupant as detected by the gaze detection section is directed toward the obstacle during self-driving of the vehicle.

5 Claims, 9 Drawing Sheets

VEHICLE OBSTACLE INFORMING DEVICE

CROSS-REFERENCE TO RELATED APPLICATION

This application claims priority under 35 USC 119 from Japanese Patent Application No. 2018-202209, filed on Oct. 26, 2018, the disclosure of which is incorporated by reference herein.

BACKGROUND

Technical Field

The present disclosure relates to a vehicle obstacle informing device.

Related Art

Japanese Patent Application Laid-Open (JP-A) No. 2007-304712 discloses a driving assist device that displays a gaze direction of a driver and the position of an obstacle in the gaze direction of a driver. In the technology of JP-A No. 2007-304712, when the driver moves their gaze direction, the gaze direction of the driver and the position of the obstacle are displayed on the new line of gaze.

However, in self-driving vehicles capable of automatic travel, although ascertaining that obstacles in the surroundings of the vehicle are being detected enables an occupant to feel reassured, the occupant may feel pestered if display is performed even if they change their gaze direction, as in JP-A No. 2007-304712.

SUMMARY

The present disclosure obtains a vehicle obstacle informing device capable of achieving both comfort and a sense of reassurance during self-driving.

A first aspect of the present disclosure is a vehicle obstacle informing device including an obstacle detection section configured to detect an obstacle in surroundings of a vehicle; a gaze detection section configured to detect a gaze direction of an occupant seated in a driving seat; and an informing section configured to make the occupant aware of the obstacle using at least one of display or audio in cases in which the gaze of the occupant as detected by the gaze detection section is directed toward the obstacle during self-driving of the vehicle.

In the vehicle obstacle informing device of the first aspect, an obstacle in the surroundings of the vehicle is detected by the obstacle detection section. The gaze direction of an occupant seated in the driving seat is detected by the gaze detection section. The occupant is made aware of the presence of the obstacle during self-driving by the informing section, using at least one out of display or audio. This enables the occupant to ascertain that obstacles are being correctly detected during self-driving, enabling the occupant to feel reassured.

Moreover, the informing section is configured to make the occupant aware of the obstacle only in cases in which the gaze of the occupant is directed toward the obstacle. Thus, the occupant is only made aware of the presence of the obstacle in cases in which the occupant is demonstrating an interest in the presence of the obstacle, and is thus less liable to feel pestered.

In a second aspect of the present disclosure, in the first aspect, the informing section may include a display device configured to make the occupant aware of the obstacle by performing display to emphasize the obstacle on a windshield partitioning between inside and outside the vehicle; and the display device may modify a display mark according to an obstacle type.

In the vehicle obstacle informing device according to the second aspect, the display mark changes according to the obstacle type, enabling the occupant to ascertain that the obstacle type has been correctly detected.

In a third aspect of the present disclosure, in the first aspect or the second aspect, the informing section only makes the occupant aware of a specific obstacle among obstacles detected by the obstacle detection section.

The vehicle obstacle informing device according to the third aspect enables the occupant to be made aware only of specific obstacles, such as a pedestrian or a vehicle traveling alongside the occupant's vehicle. In this manner, it is possible to omit the provision of information regarding obstacles such as a vehicle traveling ahead of the occupant's vehicle, of which the occupant has little need to be made aware.

In a fourth aspect of the present disclosure, in any one of the first aspect to the third aspect, the informing section includes a directional speaker; and information regarding the obstacle is output toward the occupant seated in the driving seat through the directional speaker.

In the vehicle obstacle informing device according to the fourth aspect, information regarding an obstacle is output toward the occupant through the directional speaker, thereby enabling the information regarding the obstacle to be ascertained solely by the occupant sitting in the driving seat.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a vehicle obstacle informing device 10 according to a first exemplary embodiment, with reference to the drawings. Note that the proportions in the drawings may be exaggerated to aid explanation, and therefore differ from the actual proportions. In each of the drawings, the arrow FR, the arrow UP, and the arrow LH respectively indicate a forward direction, an upward direction, and a width direction left side of a vehicle, as appropriate. Unless specifically stated otherwise, in the below explanation, simple reference to front and rear, up and down, and left and right directions refers to the front and rear in a vehicle front-rear direction, up and down in a vehicle vertical direction, and left and right when facing toward the vehicle front.

First Exemplary Embodiment

Figure 1:
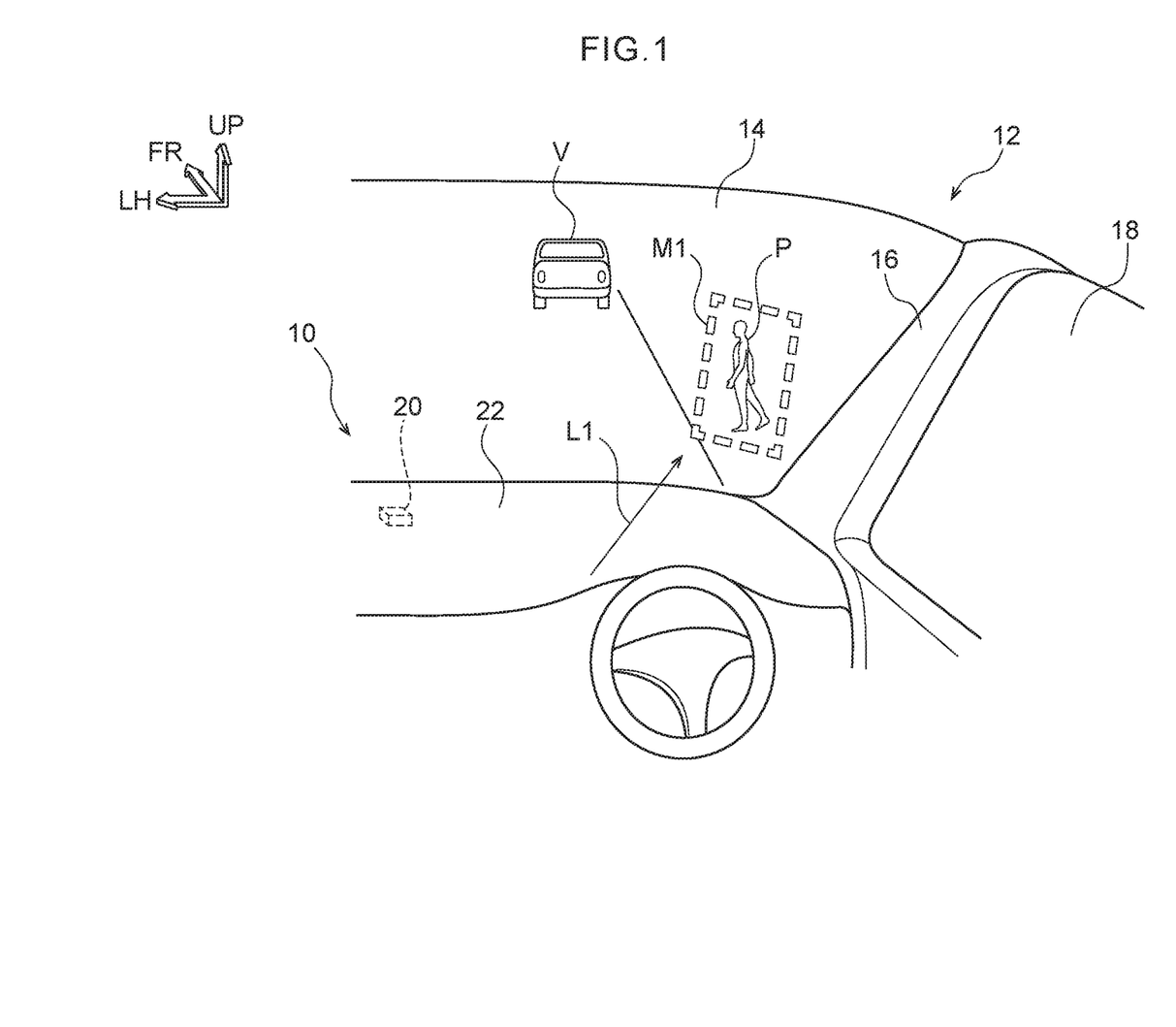
FIG. 1 is a schematic view of a vehicle cabin front section of a vehicle provided with a vehicle obstacle informing device according to a first exemplary embodiment, as viewed from the vehicle cabin side.

As illustrated in FIG. 1, a windshield 14 that partitions between the inside and the outside of the vehicle is provided at a front section of the inside of a vehicle cabin of a vehicle 12 installed with the vehicle obstacle informing device 10 according to the present exemplary embodiment. The windshield 14 is formed of a transparent member such as glass or a see-through resin, and is configured such that an occupant inside the vehicle cabin is able to see the view outside the vehicle through the windshield 14.

The vehicle 12 of the present exemplary embodiment is what is referred to as a self-driving vehicle capable of automatic travel. The vehicle 12 is capable of switching between an occupant-driven mode in which an occupant drives, and a self-driving mode in which the vehicle 12 travels automatically.

Front pillars 16 are provided on both vehicle width direction sides of the windshield 14. Each of the front pillars 16 extends along the vehicle vertical direction, and front side window glass 18 is provided at the vehicle rear side of each of the front pillars 16.

Figure 3:
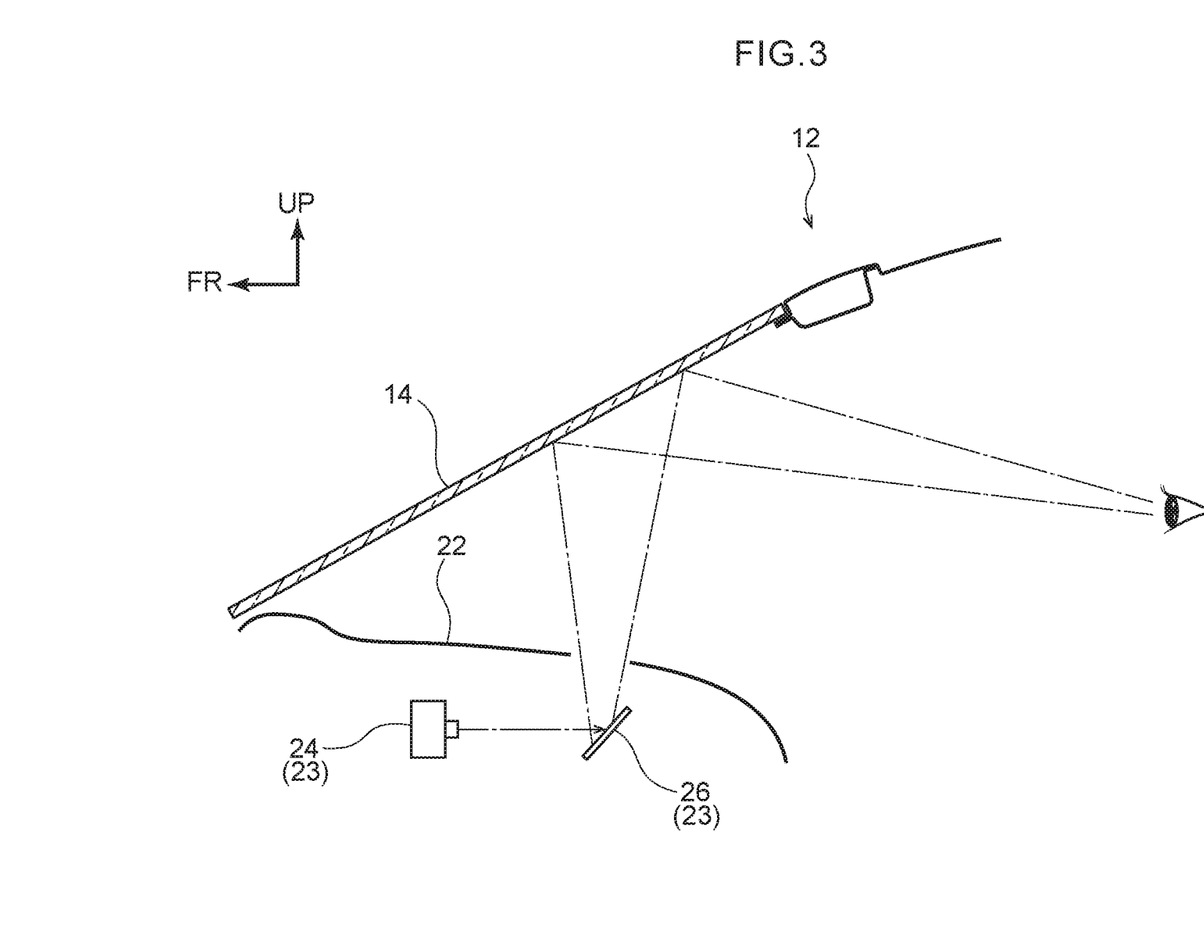
FIG. 3 is a schematic side view of a vehicle cabin front section of a vehicle provided with a vehicle obstacle informing device according to the first exemplary embodiment, as viewed along a vehicle width direction.

An instrument panel 22 is provided in the vehicle interior at a lower end portion of the windshield 14. As illustrated in FIG. 3, a display device 23, serving as an informing section, is provided at the vehicle lower side of the instrument panel 22.

The display device 23 is configured including an image output section 24 that outputs images, and a mirror 26 that reflects images output by the image output section 24 onto the windshield 14. Note that the mirror 26 is attached to a pivot shaft, not illustrated in the drawings, and the angle of the mirror 26 may be changed by pivoting the pivot shaft. An image output by the image output section 24 may be projected onto a desired region of the windshield 14 by changing the angle of the mirror 26.

As illustrated in FIG. 1, a mark M1 is displayed on the windshield 14. The mark M1 is displayed by the display device 23, and is displayed as a substantially frame shape surrounding a pedestrian P outside the vehicle. Note that the direction of the gaze of a driver (occupant) when this is performed is the direction indicated by the arrow L1. Namely, by displaying the mark M1 when the gaze direction of the driver is directed toward the pedestrian P, the display emphasizes the pedestrian P, and the driver is made aware of the presence of the pedestrian P, who is an obstacle.

Figure 2:
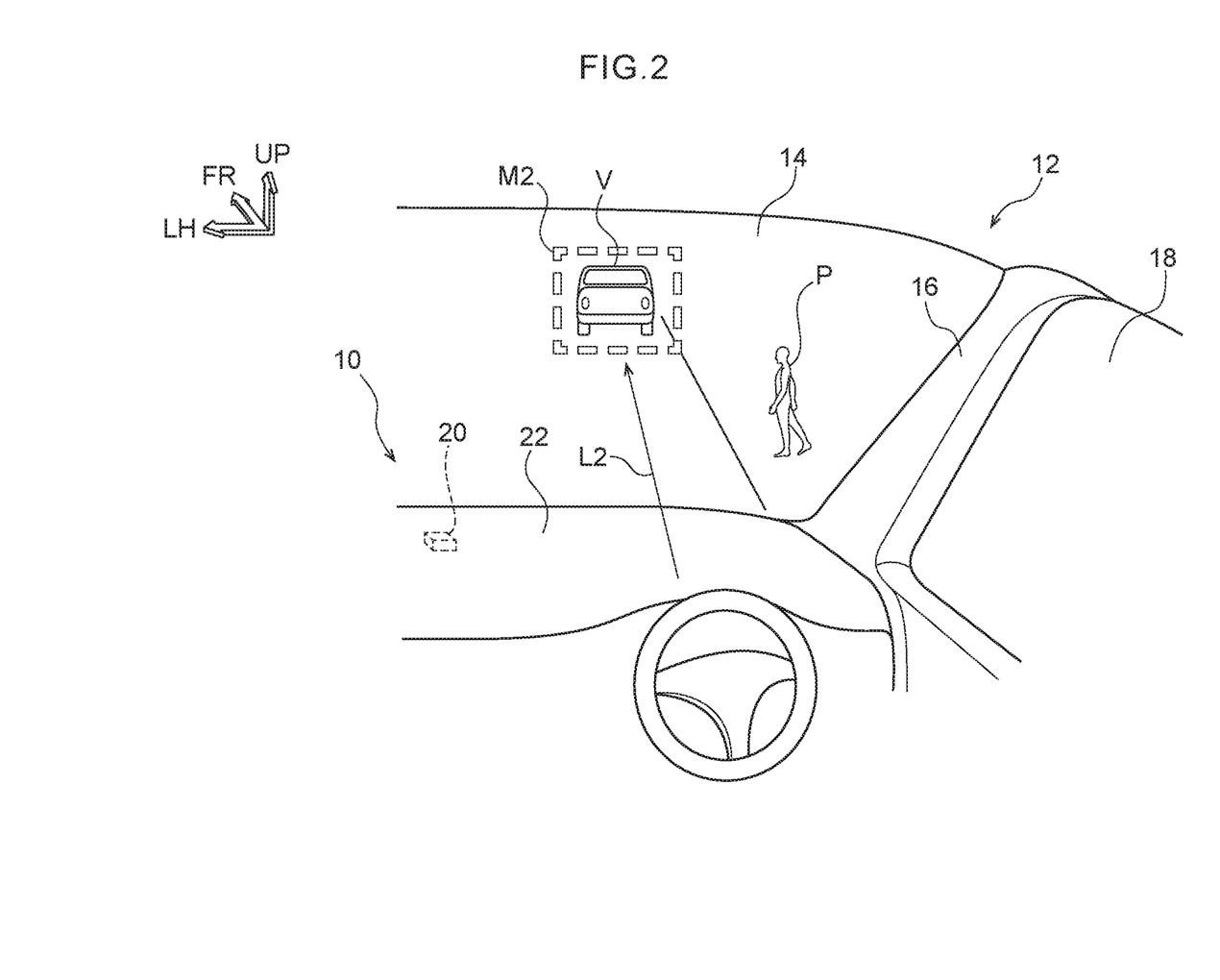
FIG. 2 is a schematic view illustrating a state which an occupant has moved their gaze direction from the state in FIG. 1.

As illustrated in FIG. 2, when the gaze direction of the driver is directed away from the pedestrian P and toward a vehicle V in front, a mark M2 is displayed by the display device 23 (FIG. 3). The mark M2 is displayed as a substantially frame shape surrounding the vehicle V. Namely, by displaying the mark M2 when the gaze direction of the driver is directed toward the vehicle V, the display emphasizes the vehicle V, and the driver is made aware of the presence of the vehicle V, this being an obstacle.

Figure 4:
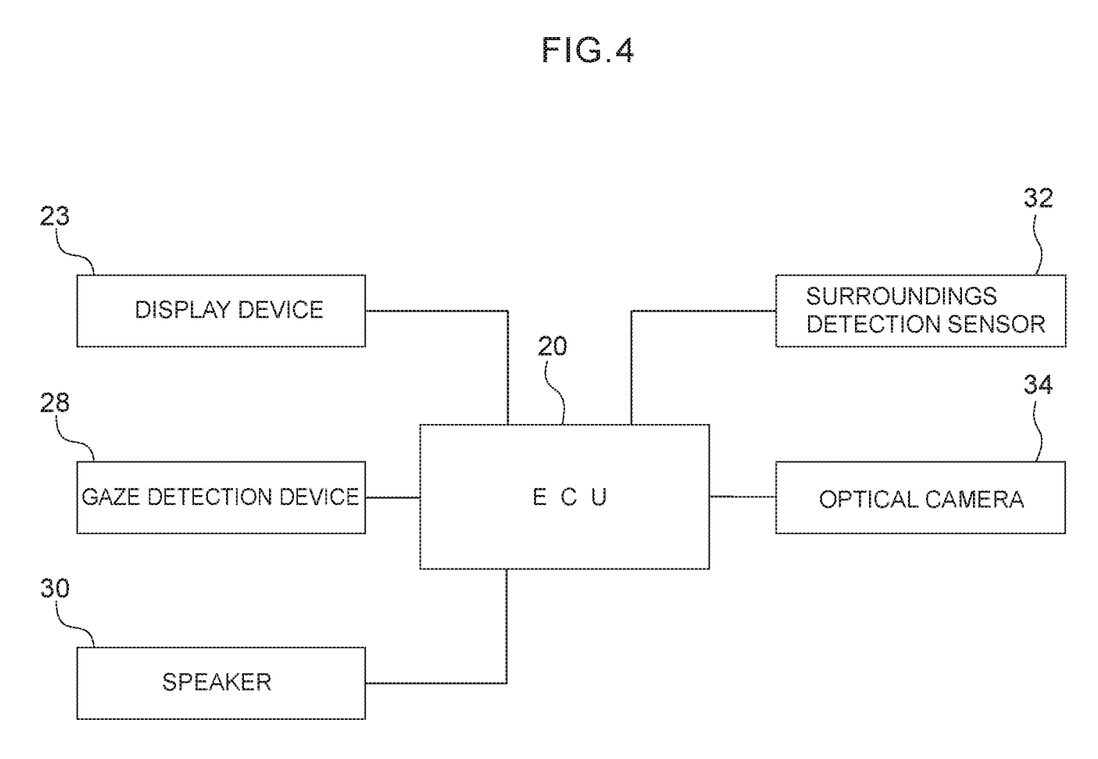
FIG. 4 is a block diagram illustrating hardware configuration of a vehicle obstacle informing device according to the first exemplary embodiment.

FIG. 4 is a block diagram illustrating hardware configuration of the vehicle obstacle informing device 10. As illustrated in FIG. 4, the vehicle obstacle informing device 10 is configured including an Electronic Control Unit (ECU) 20, the display device 23, a gaze detection device 28, a directional speaker 30, a surroundings detection sensor 32, and an optical camera 34.

As illustrated in FIG. 1, the ECU 20 is provided at the front section of the vehicle 12, and functions as a controller. As illustrated in FIG. 4, the display device 23, the gaze detection device 28, the directional speaker 30 serving as an informing section, the surroundings detection sensor 32, and the optical camera 34 are electrically connected to the ECU 20.

As described above, the display device 23 is configured including the image output section 24 and the mirror 26, and marks used when displaying for emphasis are output from the image output section 24 according to signals from the ECU 20. The angle of the mirror 26 is also adjusted according to signals from the ECU 20.

The gaze detection device 28 detects the gaze direction of an occupant sitting in a driving seat. A camera or the like attached to the instrument panel 22 or a ceiling in order to image the face of the occupant may be employed as the gaze detection device 28. A spectacle-type wearable device or the like worn by the occupant may also be employed therefor.

The directional speaker 30 is provided inside the vehicle cabin, and outputs audio according to signals from the ECU 20. The directional speaker 30 of the present exemplary embodiment employs a speaker with directionality, configured so as to output audio directed toward the driver. Thus, audio output from the directional speaker 30 is not heard, or is barely heard, by an occupant seated in a seat other than the driving seat.

The surroundings detection sensor 32 is a sensor that is provided in the vehicle 12 in order to detect the surroundings of the vehicle 12. The surroundings detection sensor 32 is configured including at least one out of millimeter-wave radar, an ultrasound sensor, or laser radar. The optical camera 34 is a camera that images ahead of the vehicle 12, and obstacles present in front of the vehicle 12 are recognized by being imaged by the optical camera 34.

Figure 5:
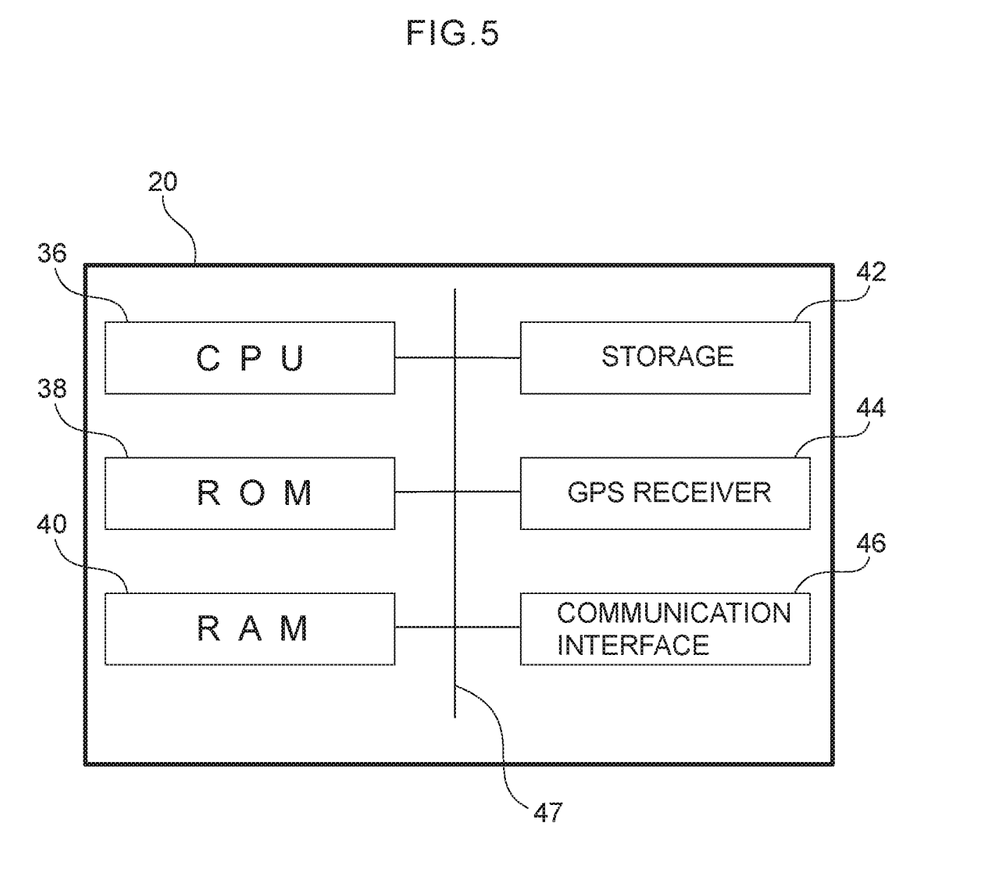
FIG. 5 is a block diagram illustrating hardware configuration of an ECU configuring a vehicle obstacle informing device according to the first exemplary embodiment.

FIG. 5 is a block diagram illustrating hardware configuration of the ECU 20 configuring the vehicle obstacle informing device 10. As illustrated in FIG. 5, the ECU 20 is configured including a Central Processing Unit (CPU/Processor) 36, Read Only Memory (ROM) 38, Random Access Memory (RAM) 40, storage 42, a GPS receiver 44, and a communication interface 46. The respective configurations are connected together so as to be capable of communicating with each other through a bus 47.

The CPU 36 is a central computation processing unit, and executes various programs to control the respective sections. Namely, the CPU 36 reads a program from the ROM 38 or the storage 42, and executes the program using the RAM 40 as a workspace. The CPU 36 controls the various configurations and performs various computation processing according to the program recorded in the ROM 38 or the storage 42.

The ROM 38 holds various programs and various data. The RAM 40 is a workspace for temporary storage of programs or data. The storage 42 is configured by a Hard Disk Drive (HDD) or a Solid State Drive (SSD), and holds various data and various programs including an operating system.

The GPS receiver 44 receives GPS signals from plural satellites, and uses a GPS to identify the position of the vehicle (the occupant's vehicle) 12 based on differences in the signal arrival times. The communication interface 46 is an interface which the ECU 20 uses to communicate with a server and other devices, and, for example, employs a protocol such as Ethernet (registered trademark), FDDI, or Wi-Fi (registered trademark).

The vehicle obstacle informing device 10 employs the hardware resources illustrated in FIG. 4 and FIG. 5 to implement various functionality. Explanation follows regarding functional configuration implemented by the vehicle obstacle informing device 10, with reference to FIG. 6.

Figure 6:
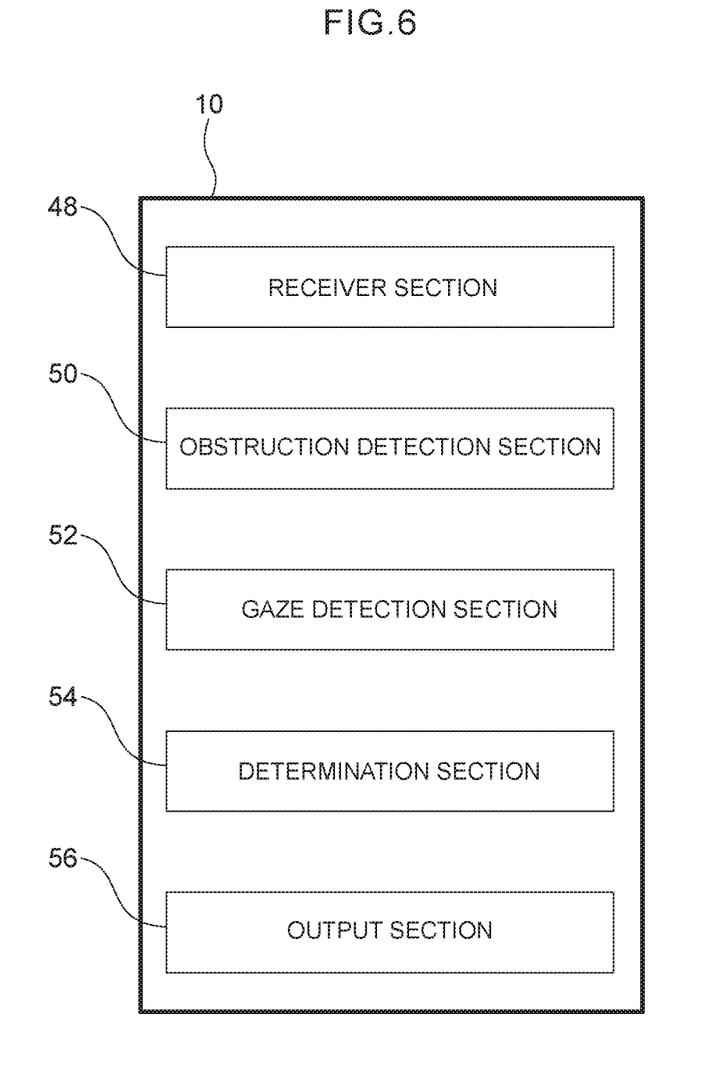
FIG. 6 is a block diagram illustrating functional configuration of a vehicle obstacle informing device according to the first exemplary embodiment.

As illustrated in FIG. 6, functional configuration of the vehicle obstacle informing device 10 includes a receiver section 48, an obstacle detection section 50, a gaze detection section 52, a determination section 54, and an output section 56. Each functional configuration is implemented by the CPU 36 of the ECU 20 reading and executing a program stored in the ROM 38 or the storage 42.

The receiver section 48 receives data regarding the gaze direction of the occupant transmitted from the gaze detection device 28. The receiver section 48 also receives data relating to obstacles in the surroundings of the vehicle 12, transmitted from the surroundings detection sensor 32, the optical camera 34, and other equipment.

The obstacle detection section 50 detects the direction, distance, type, and so on of an obstacle based on data received through the receiver section 48. The gaze detection section 52 detects the gaze direction of the occupant based on the data received from the gaze detection device 28.

The determination section 54 determines whether the gaze of the occupant is directed toward an obstacle, based on the position of the obstacle as detected by the obstacle detection section 50 and the gaze direction of the occupant as detected by the gaze detection section 52. Namely, if the obstacle is present along the gaze direction of the occupant, determination is made that the occupant is directing their gaze toward the obstacle.

The output section 56 makes the occupant aware of the presence of an obstacle using at least one method out of display or audio. Specifically, the occupant is made aware of the presence of an obstacle using at least one method out of a method using the display device 23 in which display on the windshield 14 emphasizes the obstacle, or a method in which audio information regarding the obstacle is output to the occupant through the directional speaker 30.

Figure 7:
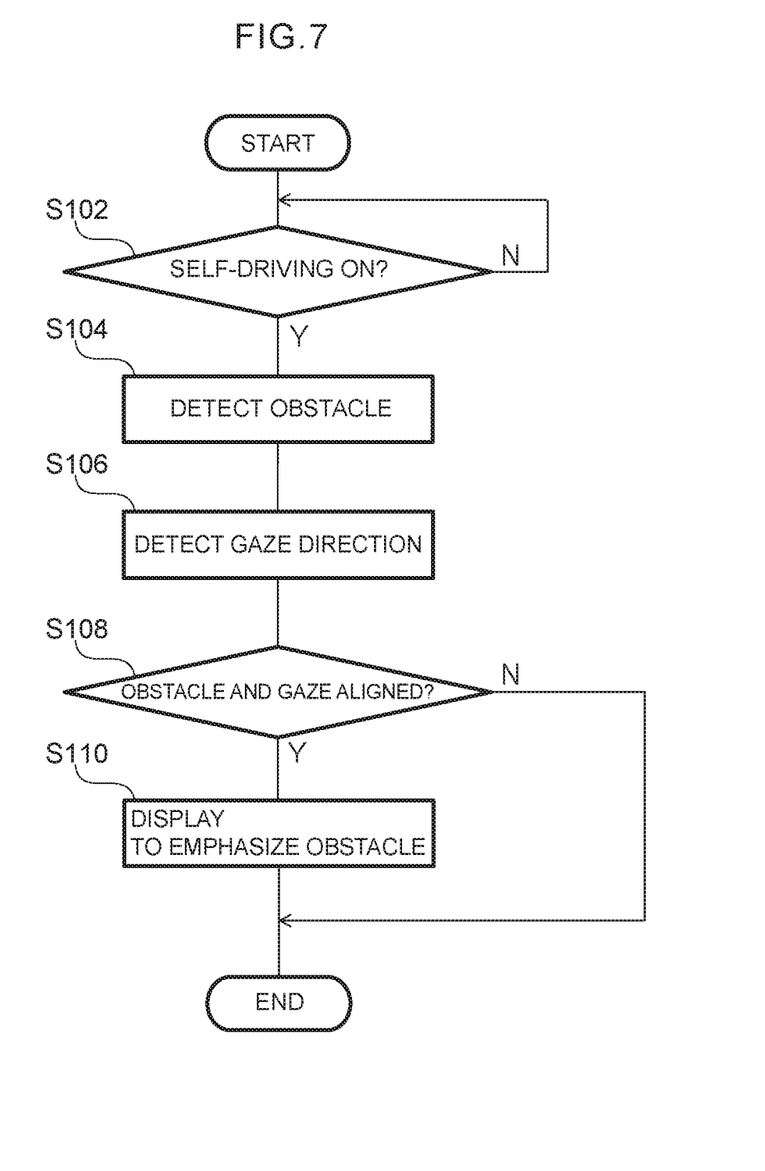
FIG. 7 is a flowchart illustrating a flow of informing processing according to the first exemplary embodiment.

Next, explanation follows regarding a flow of informing processing by the vehicle obstacle informing device 10 of the present exemplary embodiment, with reference to the flowchart of FIG. 7. For example, the CPU 36 performs the informing processing by reading a program from the ROM 38 or the storage 42, expanding the program in the RAM 40, and executing the program.

FIG. 7 illustrates an example of a flow of informing processing when display emphasizes an obstacle for an occupant. As illustrated in FIG. 7, at step S102, the CPU 36 determines whether or not self-driving is ON. For example, when the vehicle begins self-driving in response to user operation, a signal indicating that self-driving has started is transmitted to the ECU 20, and this signal may be employed to determine that self-driving is ON.

In cases in which the CPU 36 determines that self-driving is ON at step S102, processing transitions to step S104. In cases in which the CPU 36 does not determine that self-driving is ON at step S102, namely in cases in which self-driving is determined to be OFF, the processing of step S102 is repeated.

At step S104, the CPU 36 detects for obstacles in the vehicle surroundings. Note that the position and type of obstacle are detected based on signals from the surroundings detection sensor 32 and the optical camera 34 using the functionality of the obstacle detection section 50. In the state illustrated in FIG. 1, the pedestrian P and the vehicle V are detected as obstacles.

As illustrated in FIG. 7, at step S106, the CPU 36 detects the gaze direction of the occupant. Note that the gaze direction of the occupant is detected based on a signal from the gaze detection device 28 using the functionality of the gaze detection section 52.

At step S108, the CPU 36 determines whether or not an obstacle and the gaze direction are aligned. Specifically, determination is made as to whether the gaze of the occupant is directed in the direction of an obstacle, based on the position of the obstacle detected at step S104 and the gaze direction of the occupant detected at step S106. In cases in which an obstacle is present along the gaze direction of the occupant, the CPU 36 determines that the gaze of the occupant is directed toward the obstacle, and processing transitions to step S110. In cases in which the obstacle and the gaze direction are not aligned, the CPU 36 ends the informing processing. For example, in the state in FIG. 1, the pedestrian P is present along the gaze direction of the occupant, as illustrated by the arrow L1. Thus, the CPU 36 determines that the gaze of the occupant is directed toward the obstacle (pedestrian P), and processing transitions to step S110.

As illustrated in FIG. 7, the CPU 36 performs display to emphasize the obstacle at step S110. Namely, an image is output by the image output section 24 of the display device 23 and is reflected by the mirror 26 using the functionality of the output section 56, such that the mark M1 is displayed surrounding the pedestrian P as illustrated in FIG. 1.

As described above, in the present exemplary embodiment, the occupant is made aware of the presence of an obstacle by displaying for emphasis in cases in which the gaze of the occupant is directed toward the obstacle.

Operation

Explanation follows regarding operation of the present exemplary embodiment.

As described above, in the vehicle obstacle informing device 10 of the present exemplary embodiment, the obstacle detection section 50 detects for obstacles in the surroundings of the vehicle 12. The gaze detection section 52 detects the gaze direction of the occupant seated in the driving seat, and the display device 23 makes the occupant aware of the presence of obstacles during self-driving. This enables the occupant to ascertain that obstacles have been correctly detected during self-driving, enabling the occupant to feel reassured.

Moreover, the display device 23 makes the occupant aware of the presence of an obstacle only in cases in which the gaze of the occupant is directed toward the obstacle. Thus, since the occupant is made aware of the presence of an obstacle only in cases in which the occupant is demonstrating an interest in the presence of the obstacle, the occupant is less liable to feel pestered. This enables both comfort and a sense of reassurance to be attained during self-driving.

Note that although the occupant is made aware of the presence of an obstacle by performing display to emphasize the obstacle in the informing processing of the present exemplary embodiment, there is no limitation thereto. For example, informing processing such as that illustrated in FIG. 8 may be performed.

Modified Example

Figure 8:
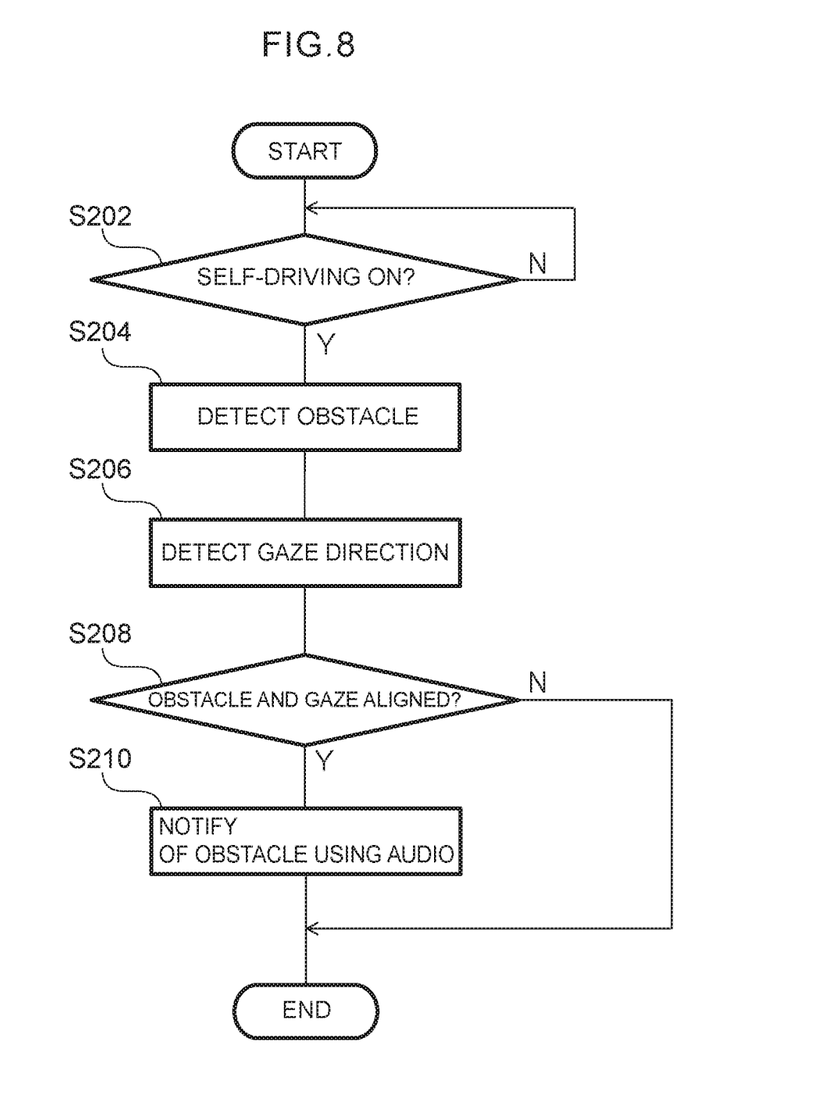
FIG. 8 is a flowchart illustrating a flow of informing processing according to a modified example.

FIG. 8 illustrates an example of a flow of informing processing in which an occupant is notified of an obstacle using audio. As illustrated in FIG. 8, at step S202, the CPU 36 determines whether or not self-driving is ON.

In cases in which the CPU 36 determines that self-driving is ON at step S202, processing transitions to step S204. In cases in which the CPU 36 does not determine that self-driving is ON at step S202, namely in cases in which self-driving is determined to be OFF, the processing of step S202 is repeated.

At step S204, the CPU 36 detects for obstacles in the vehicle surroundings. At step S206, the CPU 36 detects the gaze direction of the occupant. Note that the gaze direction of the occupant is detected based on a signal from the gaze detection device 28 using the functionality of the gaze detection section 52.

At step S208, the CPU 36 determines whether or not an obstacle and the gaze direction are aligned. Determination is made using a similar method to that at step S108 in the flowchart of FIG. 7. In cases in which the CPU 36 determines that the gaze of the occupant is directed toward an obstacle, processing transitions to step S210. In cases in which an obstacle and the gaze direction are not aligned, the CPU 36 ends the informing processing.

At step S210, the CPU 36 performs audio notification regarding the obstacle. Namely, the CPU 36 outputs information regarding the obstacle toward the occupant through the directional speaker 30 using the functionality of the output section 56.

As described above, in the present modified example, the occupant is made aware of the presence of an obstacle using audio notification in cases in which the gaze of the occupant is directed toward the obstacle. Outputting information regarding an obstacle to the occupant through the directional speaker 30 in this manner enables the information regarding the obstacle to be ascertained solely by the occupant sitting in the driving seat. Namely, this enables solely the occupant requiring information regarding obstacles to be made aware of the information regarding the obstacle.

Note that the display device 23 may perform display for emphasis in addition to performing audio notification at step S210.

Second Exemplary Embodiment

Explanation follows regarding a vehicle obstacle informing device according to a second exemplary embodiment. Note that configuration similar to that of the first exemplary embodiment is appended with the same reference numerals, and explanation thereof is omitted as appropriate.

Figure 9:
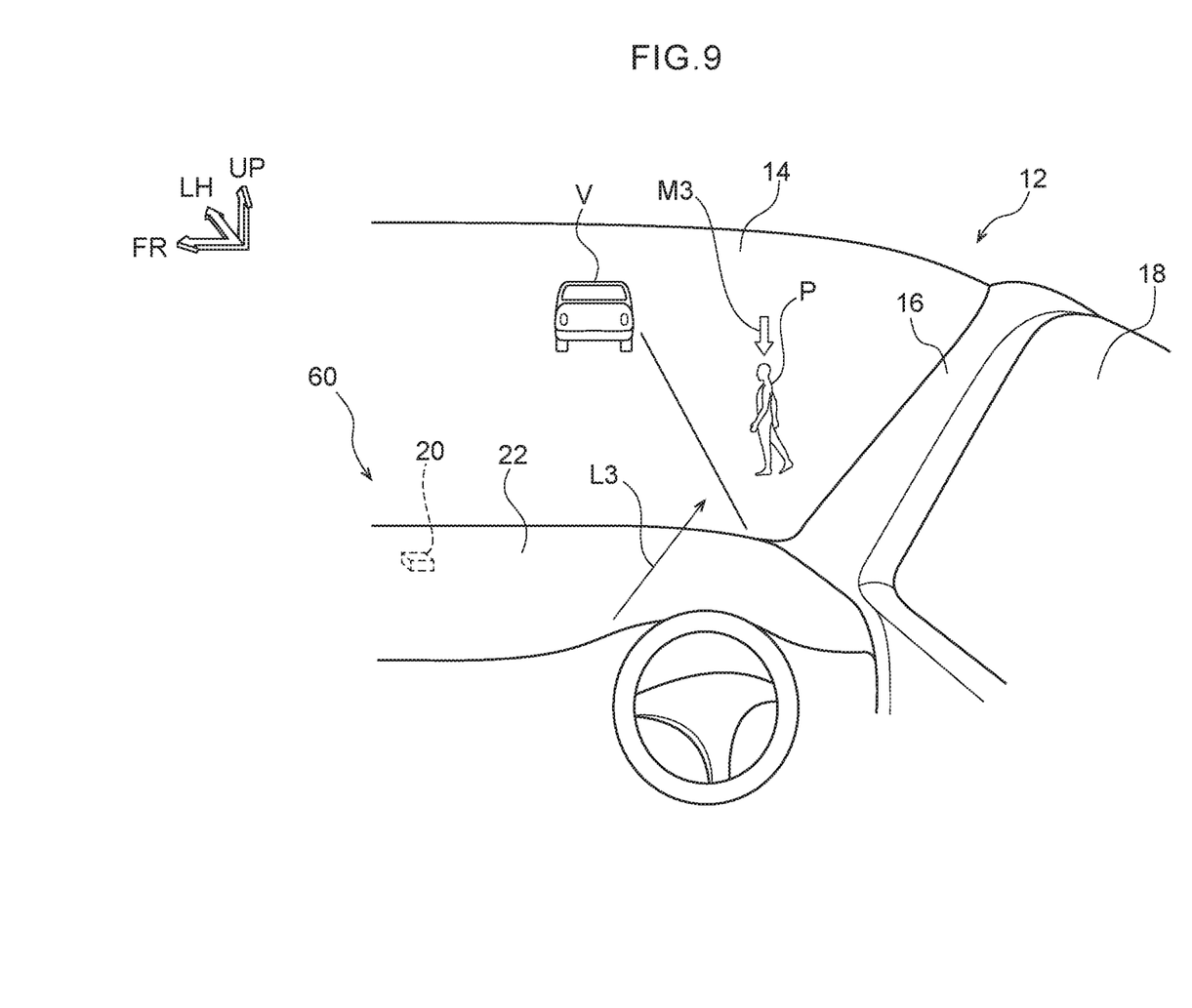
FIG. 9 is a schematic view of a vehicle cabin front section of a vehicle provided with a vehicle obstacle informing device according to a second exemplary embodiment, as viewed from the vehicle cabin side.

As illustrated in FIG. 9, a vehicle obstacle informing device 60 of the present exemplary embodiment differs from the first exemplary embodiment in that a displayed mark is modified according to the obstacle type. Other configuration is similar to that of the first exemplary embodiment.

In the present exemplary embodiment, a mark M3 is displayed on the windshield 14 in cases in which the gaze direction of an occupant is directed toward a pedestrian P outside the vehicle, as illustrated by the arrow L3. The mark M3 is displayed by the display device 23 as an arrow-shaped icon above the head of the pedestrian P outside the vehicle. Namely, by displaying the mark M3 in cases in which the gaze direction of the driver is directed toward the pedestrian P, the display emphasizes the pedestrian P such that the driver is made aware of the presence of an obstacle.

In cases in which the gaze direction of the occupant is directed toward a vehicle V, the mark M2 is displayed, similarly to in the first exemplary embodiment (see FIG. 2). In this manner, the display mark is modified according to the obstacle type in the present exemplary embodiment.

Note that similarly to in the first exemplary embodiment, the flowcharts illustrated in FIG. 7 and FIG. 8 may be employed in a flow of informing processing in the present exemplary embodiment. Namely, at step S104 of FIG. 7, the CPU 36 detects the obstacle type. At step S110, the CPU 36 modifies the mark used when displaying for emphasis according to the obstacle type, such that the display of the display device 23 emphasizes the obstacle.

Operation

Explanation follows regarding operation of the present exemplary embodiment.

In the vehicle obstacle informing device 60 of the present exemplary embodiment, the display mark changes according to the obstacle type, enabling the occupant to ascertain that the obstacle type has been correctly detected. The enables the occupant to feel further reassured during self-driving. Other operation is similar to that in the first exemplary embodiment.

Exemplary embodiments and a modified example have been explained above. Obviously various modifications may be implemented within a range not departing from the spirit of the present disclosure. For example, although pedestrians and surrounding vehicles are detected as obstacles in the above exemplary embodiments, other obstacles may also be detected and the occupant made aware thereof. Obstructions such as objects that have fallen onto the road and roadwork zones may also be detected as obstacles.

Alternatively, configuration may be such that the occupant is only made aware of specific obstacles out of detected obstacles. For example, configuration may be such that the occupant is only made aware of pedestrians and vehicles traveling alongside their vehicle as specific obstacles. In such cases, display does not emphasize a vehicle traveling in front, even if the gaze of the occupant is directed toward this vehicle. In this manner, the occupant is not informed of obstacles of which there is little need for the occupant to be made aware, thereby enabling comfort during self-driving to be improved.

Furthermore, although the display device 23 is used to display marks on the windshield 14 in the above exemplary embodiments, there is no limitation thereto, and display for emphasis may be performed by another method. For example, a see-through liquid crystal display may be provided to a front surface of the windshield 14, and a mark may be displayed on the see-through liquid crystal display.

Furthermore, although display for emphasis is performed on the windshield 14 in the above exemplary embodiments, in addition thereto, display for emphasis may also be performed on the front side window glass 18. For example, see-through liquid crystal displays may be provided on the front side window glass 18, and a mark may be displayed on the front side window glass 18 in cases in which the gaze of the occupant is directed through the front side window glass 18 toward an obstacle outside the vehicle.

Moreover, the processing that is executed by the CPU 36 reading software (programs) in the above exemplary embodiment may be executed by various processors other than a CPU. Examples of such processors include a Programmable Logic Device (PLD) in which circuit configuration may be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). The above processing may be executed by a single one of such processors, or may be executed by a combination of two or more processors of the same type or different types (for example, by plural FPGAs, or a combination of a CPU and an FPGA). More specific examples of hardware structures of such processors include electric circuits configured by combining circuit elements such as semiconductor devices.

Moreover, although the storage 42 serves as a recording section in the above exemplary embodiments, there is no limitation thereto. For example, a recording section may be configured by a recording medium such as a Compact Disk (CD), a Digital Versatile Disk (DVD), or Universal Serial Bus (USB) memory.

What is claimed is:

1. A vehicle obstacle informing device comprising:
   an obstacle detection section configured to detect an obstacle in surroundings of a vehicle;
   a gaze detection section configured to detect a gaze direction of an occupant seated in a driving seat; and
   an informing section configured to:
   determine whether the gaze direction of the occupant as detected by the gaze detection section is directed toward the obstacle during self-driving of the vehicle;
   determine whether the detected obstacle corresponds to one of a plurality of predetermined obstacles;
   make the occupant aware of the detected obstacle using at least one of display or audio in response to determination that the gaze direction of the occupant as detected by the gaze detection section is directed toward the obstacle during self-driving of the vehicle and determination that the detected obstacle is a first object type obstacle that corresponds to one of the plurality of predetermined obstacles; and
   withhold making the occupant aware of the detected obstacle using any of display or audio in response to determination that the gaze direction of the occupant as detected by the gaze detection section is directed toward the obstacle during self-driving of the vehicle and determination that the detected obstacle corresponds to a second object type obstacle that corresponds one of the plurality of predetermined obstacles, and wherein the first object type obstacle is different form the second object type obstacle.

2. The vehicle obstacle informing device of claim 1, wherein:
   the informing section includes a display device configured to make the occupant aware of the obstacle by performing display to emphasize the obstacle on a windshield partitioning between inside and outside the vehicle; and
   the display device modifies a display mark according to an obstacle type.

3. The vehicle obstacle informing device of claim 1, wherein:
   the informing section includes a directional speaker; and
   information regarding the obstacle is output toward the occupant seated in the driving seat through the directional speaker.

4. The vehicle obstacle informing device of claim 2, wherein the display device is configured to display a frame shaped mark surrounding the obstacle.

5. The vehicle obstacle informing device of claim 1, wherein the plurality of predetermined obstacles includes a pedestrian or a vehicle traveling alongside the occupant's vehicle.

* * * * *